United States Patent
Kaiser et al.

(10) Patent No.: US 9,514,886 B1
(45) Date of Patent: Dec. 6, 2016

(54) CRYOGENIC GRINDING OF TANTALUM FOR USE IN CAPACITOR MANUFACTURE

(71) Applicant: Greatbatch Ltd., Clarence, NY (US)

(72) Inventors: Donald F. Kaiser, Clarence Center, NY (US); William C. Thiebolt, Tonawanda, NY (US); Jason T. Hahl, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 0 days.

(21) Appl. No.: 15/220,345

(22) Filed: Jul. 26, 2016

Related U.S. Application Data

(62) Division of application No. 13/932,034, filed on Jul. 1, 2013.

(60) Provisional application No. 61/665,936, filed on Jun. 29, 2012.

(51) Int. Cl.
| | |
|---|---|
| *H01G 9/00* | (2006.01) |
| *B02C 19/18* | (2006.01) |
| *H01G 9/145* | (2006.01) |
| *H01G 9/042* | (2006.01) |

(52) U.S. Cl.
CPC .......... *H01G 9/0029* (2013.01); *B02C 19/186* (2013.01); *H01G 9/042* (2013.01); *H01G 9/145* (2013.01)

(58) Field of Classification Search
CPC ............. H01G 9/0029; H01G 9/0032; H01G 9/0036; H01G 9/0042; H01G 9/145; H01G 9/025; H01G 9/022
See application file for complete search history.

(56) References Cited

U.S. PATENT DOCUMENTS

| | | |
|---|---|---|
| 5,217,526 A | 6/1993 | Fife |
| 6,219,222 B1 | 4/2001 | Shah et al. |
| 6,375,710 B2 | 4/2002 | Moore et al. |
| 6,687,117 B2 | 2/2004 | Liu et al. |
| 6,896,807 B1 | 5/2005 | Smith et al. |
| 7,012,799 B2 | 3/2006 | Muffoletto et al. |
| 7,813,107 B1 | 10/2010 | Druding et al. |
| 7,983,022 B2 | 7/2011 | O'Connor et al. |
| 2003/0090857 A1 | 5/2003 | Liu et al. |
| 2006/0269436 A1 | 11/2006 | Yuan et al. |
| 2007/0180950 A1 | 8/2007 | Thon et al. |
| 2015/0072235 A1* | 3/2015 | Hong ............... H01M 4/134 429/218.1 |

FOREIGN PATENT DOCUMENTS

| | | |
|---|---|---|
| GB | 1267699 | 3/1972 |
| JP | 2009176972 | 6/2009 |
| WO | 2005079209 | 9/2005 |

* cited by examiner

*Primary Examiner* — Seahvosh Nikmanesh
(74) *Attorney, Agent, or Firm* — Steven W. Winn

(57) ABSTRACT

An electrolytic capacitor comprising an anode comprised of cryogenically milled anode material is described. The cryogenic milling process prepares the active anode material for anode fabrication. The capacitor further comprises a casing of first and second casing members secured to each other to provide an enclosure. A feedthrough electrically insulated from the casing and from the casing and extending there from through a glass-to-metal seal, at least one anode electrically connected within the casing, a cathode, and an electrolyte. The cathode is of a cathode active material deposited on planar faces of the first and second casing members.

20 Claims, 7 Drawing Sheets

CRYOGENIC GRINDING OF TANTALUM FOR USE IN CAPACITOR MANUFACTURE

CROSS-REFERENCE TO RELATED APPLICATION

This application is a divisional application of U.S. patent application Ser. No. 13/932,034, filed on Jul. 1, 2013, which claims priority from U.S. Provisional Application Ser. No. 61/665,936, filed Jun. 29, 2012.

TECHNICAL FIELD

The present invention relates to the manufacture of capacitors, more specifically, to the processing of materials that comprise the anode of an electrolytic capacitor.

BACKGROUND OF THE INVENTION

As more and more medical applications are investigated and implemented to aid and assist the human body, devices needed to deliver the desired therapy are becoming increasingly more sophisticated, both functionally and in terms of their structural makeup. Modern implantable devices require power sources that are smaller in size, but powerful enough to meet the therapy requirements. For example, a cardiac defibrillator has a battery powering circuits performing such functions as, for example, the heart sensing and pacing functions. This requires electrical current of about 1 microampere to about 100 milliamperes. From time-to-time, the cardiac defibrillator may require a generally high rate, pulse discharge load component that occurs, for example, during charging of a capacitor assembly in the defibrillator for the purpose of delivering an electrical shock to the heart to treat a tachyarrhythmia, the irregular, rapid heartbeats that can be fatal if left uncorrected. This requires electrical current of about 1 ampere to about 4 amperes.

The current trend in medicine is to make cardiac defibrillators, and like implantable devices, as small and lightweight as possible without compromising their power. This, in turn, means that the components within the capacitor, particularly the anode, need to be constructed to optimum parameters as well as be free of contaminants.

Capacitor anodes typically comprise an anode active material such as tantalum, aluminum, or niobium. The anode active material is generally milled into a powdered form and pressed into a pellet. Furthermore, the anode material is generally sintered and then subjected to an anodizing or formation process before being incorporated into a capacitor. In general, the electrical performance of an electrolytic capacitor, such as energy density and leakage current, can be improved by optimally controlling the particle size, morphology, oxidation state and contamination level of the anode active material.

Current anode active material processing methods typically comprise a lengthy multi-step process that is both cumbersome and time consuming. In addition, because of the many steps, the anode active material resulting from these prior art material preparation processes is generally prone to process variability and the potential introduction of contamination which could degrade the electrical performance of the resulting capacitor.

One such prior art material preparation process is outlined in FIG. 4. This prior art anode active material preparation process consists of approximately eleven steps whereas the material preparation process of the current invention, outlined in FIG. 5, comprises only three steps. The simplified process of the present invention significantly reduces processing time and the potential for introducing contamination into the processed material. In addition, the simplified material preparation process of the present invention decreases the possibility of introducing error into the process. Furthermore, the anode material preparation process of the present invention improves material consistency, which as a result, improves the electrical performance of the capacitor.

What is needed, therefore, is a simplified, less cumbersome material preparation process that provides an anode active material with more consistent properties. In addition, what is needed is a simplified material preparation process that is less prone to processing errors and the potential of contaminating the material.

SUMMARY OF THE INVENTION

The present invention provides a process by which the anode active material, comprising the anode within an electrolytic capacitor, is prepared. More specifically, the present invention provides a simplified process by which the anode active material is prepared through cryogenic milling prior to fabrication into an anode of an electrolytic capacitor. The material preparation process of the present invention prepares the anode active material with more consistency, proper oxidation state and reduced potential for contamination, thereby providing an electrolytic capacitor with increased energy density and reduced current leakage.

In comparison, the prior art material preparation process shown in FIG. 4 is a multi-step process that is both time consuming and cumbersome. In addition, the anode material produced by the prior art process is susceptible to possible compositional inconsistencies and contamination. The prior art anode material preparation process is a cumbersome process that comprises as many as 13 steps. The parameters of each step are variable and are largely dependent upon previously performed steps. Such a complex process is not conducive to producing a material having consistent properties.

Electrolytic capacitors typically comprise anodes comprised of tantalum. At room temperature, tantalum is a ductile material that makes milling of the material difficult. Thus, in order for tantalum to be milled to a desired particle size, it is usually embrittled through the use of a hydrogen embrittlement process. In the process, the material is exposed to hydrogen gas at temperatures as high as 900° C. This embrittlement procedure transforms the generally ductile tantalum material into brittle tantalum that is easier for the material to be milled and broken down into smaller particles. However, the hydrogen embrittlement process modifies the material such that its surface properties, in particular its surface oxidation state is not ideal. Therefore, additional processing steps are performed to adjust the properties of the anode active material to desired conditions.

Ideally the anode active material, specifically that of tantalum, comprises a layer of pentoxide along and within its surface. The resistivity value of tantalum pentoxide is generally desirable for controlling current leakage in an electrolytic capacitor. However, if diffusion of oxygen is not correctly controlled, and too much oxygen diffuses into the surface of the tantalum, a less desirable phase of tantalum oxide is formed. Such undesirable phases of tantalum oxide typically have a reduced electrical resistivity, which tends to increase the current leakage.

If too much oxygen is dissolved into tantalum, the material is then generally subjected to a de-oxidation process whereby oxygen is removed through the introduction of magnesium into the material. The addition of magnesium, while desired to reduce the amount of oxygen from the tantalum surface, adversely contaminates the material. Thus, an additional process whereby the magnesium is removed through an acid leaching process is typically performed. The acid leaching process utilizes caustic acids to remove the magnesium. However, this acid leaching process is not desirable because of the potential harm the caustic acids may cause to both humans and the environment. In addition, the utilization of the acid leaching process requires additional acid removal and containment procedures which add cost to the material preparation process.

Therefore, the material preparation process of the present invention was developed to address the shortfalls of the prior art process. In contrast to embrittling the anode material through exposure in a hydrogen rich high temperature environment which adversely alters the oxidation state of the material, the present material preparation process utilizes cryogenic temperatures to freeze and embrittle the anode active material. Thus, by utilizing cryogenic temperatures, of about $-150°$ C. or less, the anode material is frozen to an embrittled state such that it can be effectively milled to a desired particle size. Such a milling process does not utilize hydrogen which adversely alters the oxidation state of the material.

Specifically, at about $-198°$ C., tantalum undergoes a phase change in which the ductile metal transitions into a body centered cubic (BCC) crystalline structure. At this temperature tantalum becomes embrittled which facilitates its milling without the need to expose it to gas, such as hydrogen gas of the prior art. Thus, the potential to adversely alter the surface oxidation state or phase of the material through exposure to a gas is reduced.

In contrast to the prior art, the anode active material, such as tantalum, is milled in its frozen embrittled state. Since the hydrogen embrittlement and sequential de-hydride steps are eliminated, the surface properties and electrical resistance of the anode material can be better controlled. Furthermore, the need to subject the material to additional, potentially environmentally harmful processing steps such as de-oxidation and acid leach is also eliminated.

Thus, the material preparation process of the present invention improves control of the material properties of capacitor anode materials, particularly tantalum. In addition, the material preparation process of the present invention eliminates added processing steps, which therefore increases material preparation speed as well as reduces the potential of introducing contamination and error within the material.

DETAILED DESCRIPTION OF THE PREFERRED EMBODIMENTS

Figure 1:
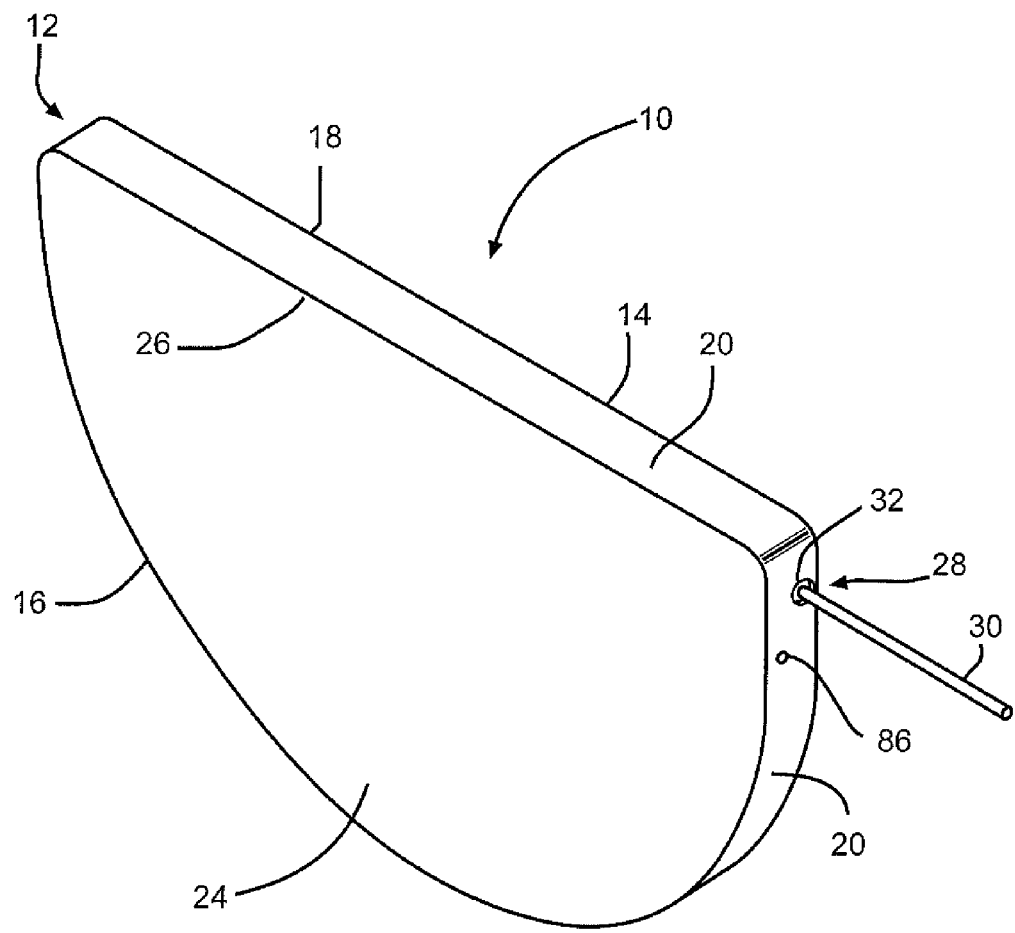
FIG. 1 is a perspective view of an embodiment of a capacitor of the present invention.

Turning now to the drawings, FIG. 1 is a perspective view of a capacitor 10 according to the present invention. The capacitor 10 comprises at least one anode composed of an anode active material and a cathode of a cathode active material housed inside a hermetically sealed casing 12. The capacitor electrodes are operatively associated with each other by a working electrolyte (not shown) contained inside the casing. The anodes, cathode and electrolyte of capacitor 10 will be described in detail hereinafter.

Figure 3:
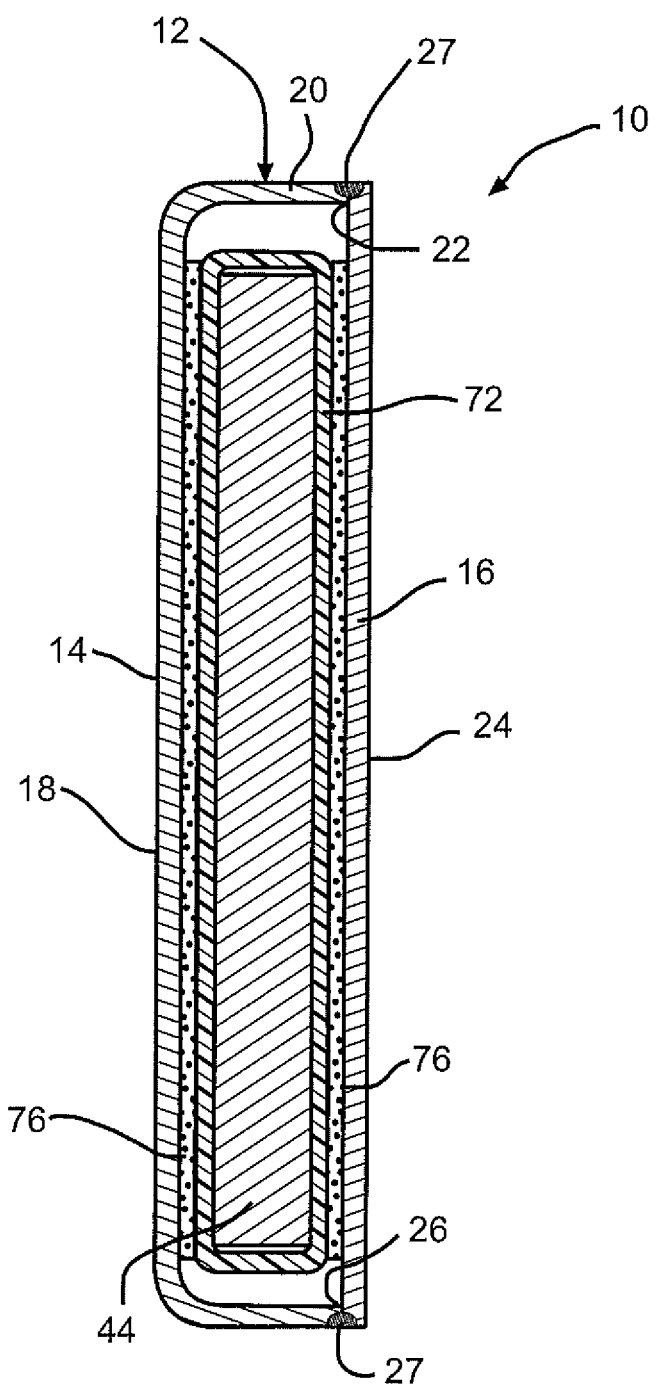
FIG. 3 illustrates a cross-sectional view of an embodiment of a capacitor comprising one anode.
Figure 3A:
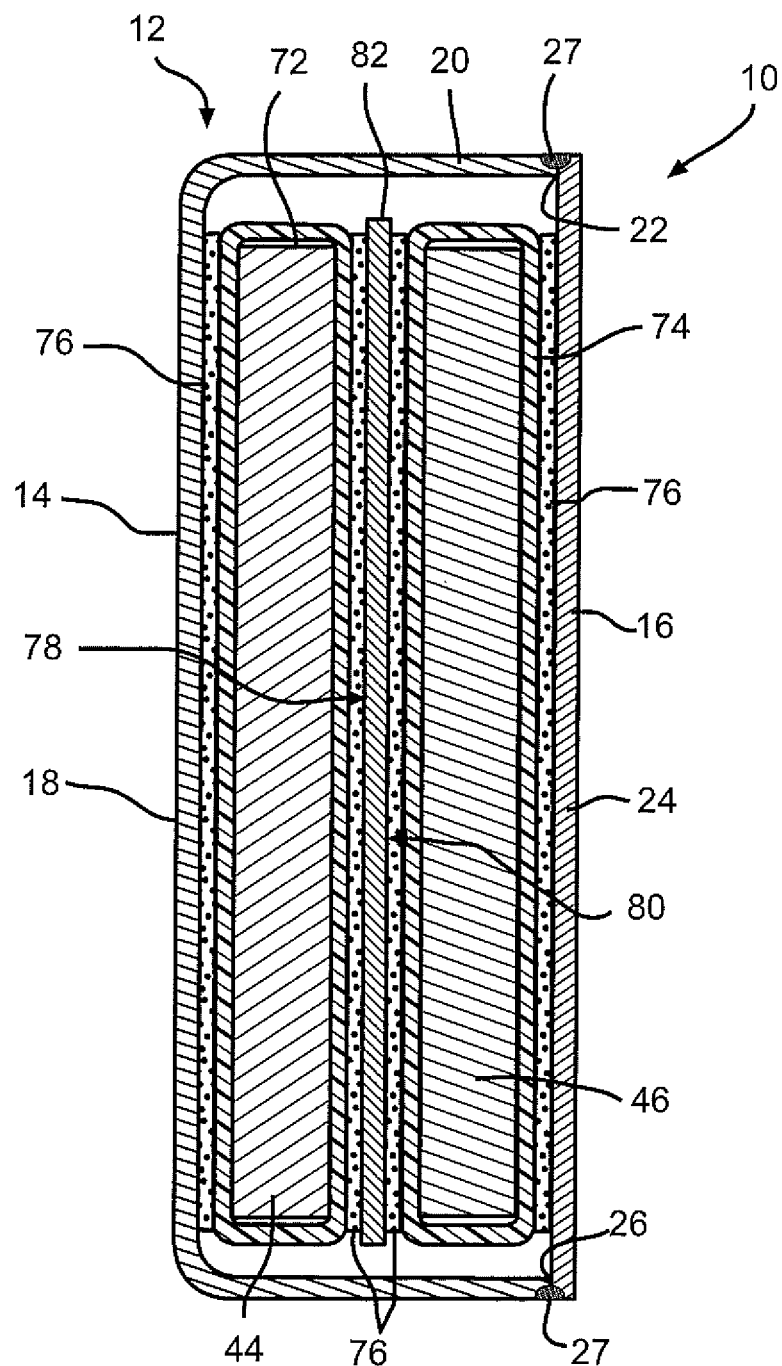
FIG. 3A illustrates a cross-sectional view of an embodiment of a capacitor comprising two anodes.

As particularly shown in FIGS. 1, 3 and 3A, the casing 12 is of metal material comprising first and second casing members 14 and 16. First casing member 14 comprises a first face wall 18 joined to a surrounding side wall 20 extending to an edge 22 (FIGS. 3 and 3A). Second casing member 16 is in the shape of a plate and comprises a second face wall 24 having a surrounding edge 26 (FIGS. 3 and 3A). The casing members 14 and 16 are hermetically sealed together by welding the overlapping edges 22 and 26 where they contact each other. The weld 27 is provided by any conventional means; however, a preferred method is by laser welding.

A feedthrough 28 electrically insulates an anode terminal wire 30 from the casing 12. The terminal wire 30 extends from within the casing 12 to the outside thereof. The location of a hole 32 in the surrounding side wall 20 of the casing member 12 into which the feedthrough 28 is mounted is preferably offset towards the front edge 22 or towards the face wall 18 in order to align with an embedded wire of one of the anodes.

Feedthrough 28 is preferably comprised of a glass to metal seal (GTMS) comprising a ferrule 34 defining an internal cylindrical through bore or passage 36 of constant inside diameter. The ferrule 34 preferably comprises a rectangular cross-section. However, the ferrule 34 may also comprise a cross-section of a cylindrical shape. The rectangular cross-sectional shape of the ferrule 34 provides a preferred surface on which the cathode current collector can be directly welded thereto. Furthermore, an insulative glass 40 provides a hermetic seal between the bore 36 and the anode terminal wire 30 passing therethrough.

Figure 2:
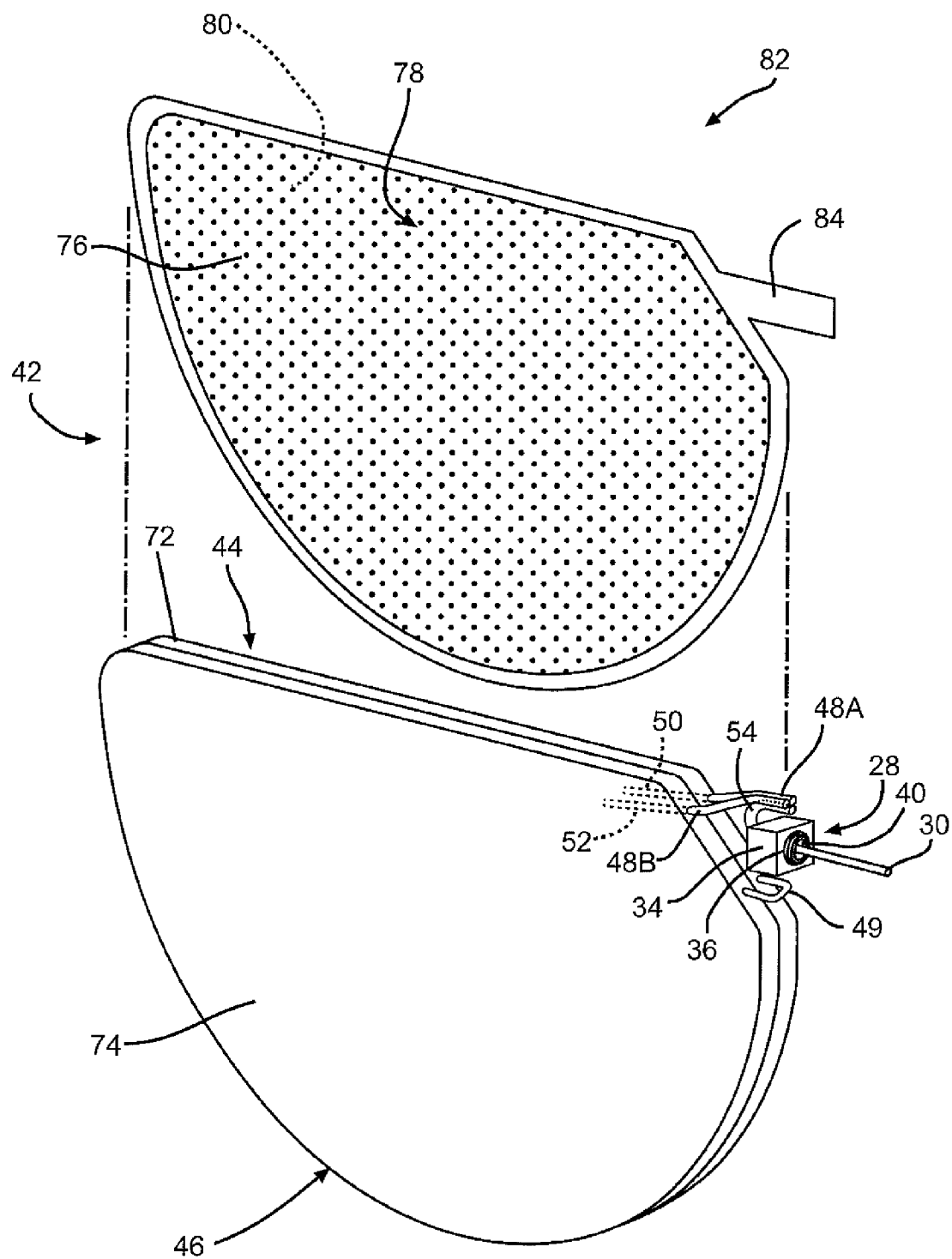
FIG. 2 illustrates a perspective view of an embodiment of an anode assembly of the present invention.

The capacitor 10 further comprises at least one anode that is connectable to the terminal wire 30 of feedthrough 28 within the casing 12. FIG. 2 illustrates a perspective view of an embodiment of an anode assembly 42 comprising a pair of anodes connected in parallel to the terminal wire 30. Although a parallel connection between anodes is preferred, the anodes may be connected in an electrical series manner.

As shown in the embodiment of FIG. 2, the anode assembly 42 includes a first anode pellet 44 and a second anode pellet 46. A first anode wire 48A, having a first end portion 50, is shown embedded in the first pellet 44. A second anode wire 48B, having a second end portion 52, is shown embedded in the second pellet 46. Anode wires 48A, 48B are preferably electrically connected to an interior portion 54 of an anode terminal wire 30 by a suitable joining process, such as laser welding, in a later manufacturing step. Alternatively, the anode wire may be of a continuous length in which its end branches into two wires that are each respectively embedded into the first and second pellets 44, 46. Furthermore, as shown, a third anode wire 49 may be used to connect the two anode pellets 44, 46 in electrical series.

Figure 6:
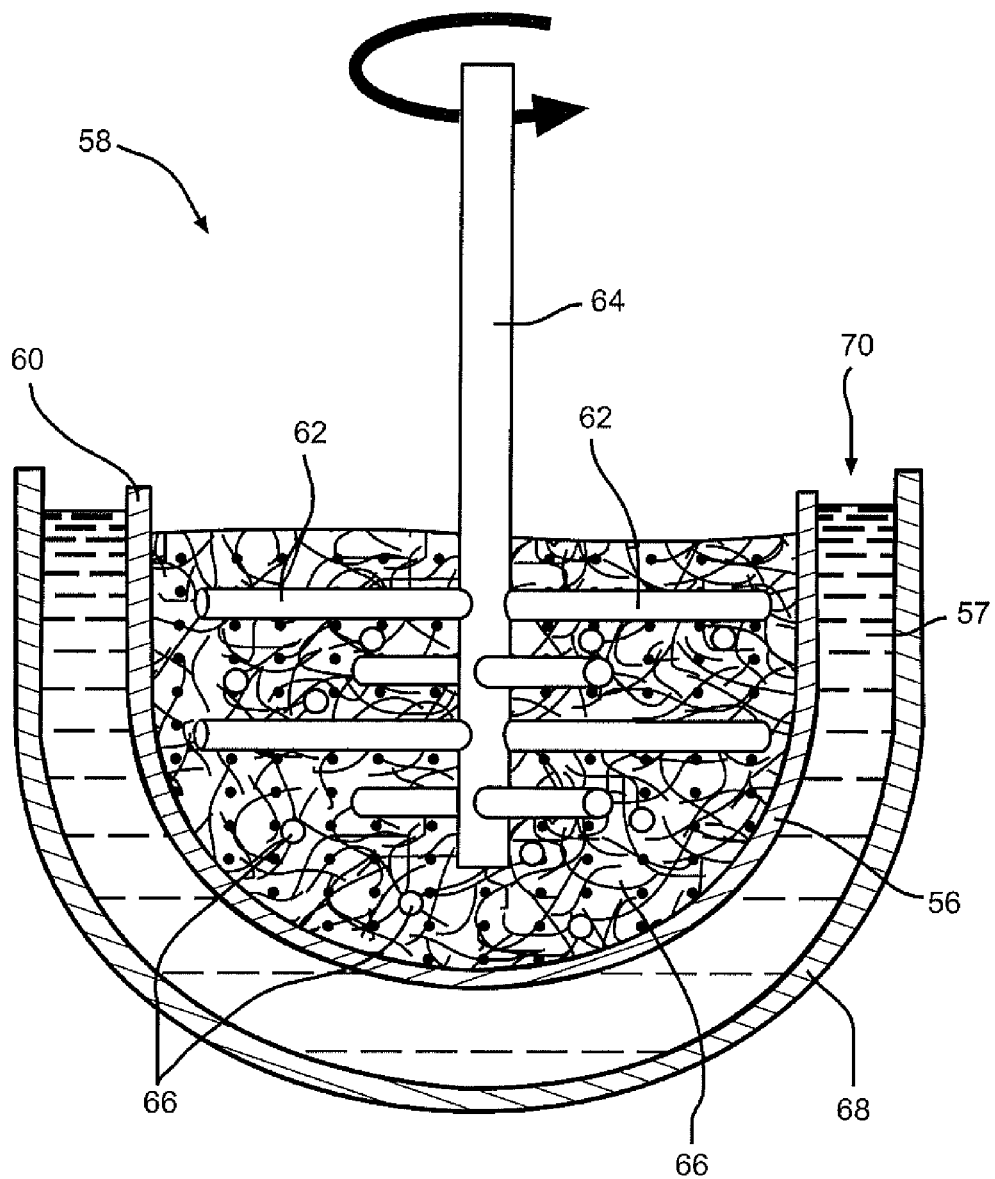
FIG. 6 illustrates an embodiment of a cryogenic milling instrument of the present invention.

Each anode pellet 44, 46 is preferably composed of an anode active material 56 (FIG. 6). The anode active material of the anode pellets 44, 46 is typically composed of a metal selected from the group consisting of tantalum, aluminum, titanium, niobium, zirconium, hafnium, tungsten, molybdenum, vanadium, silicon, germanium, and alloys and/or mixtures thereof in the form of a pellet. However, tantalum is a preferred anode material because its high dielectric constant facilitates the ability to produce a capacitor having a reduced electrical current leakage.

An ideal tantalum anode comprises a highly porous structure having a fairly uniform oxide surface thickness. Furthermore, it is preferred that the surface of the tantalum material comprise a fairly uniform thickness of tantalum pentoxide. Tantalum pentoxide is preferred because of its increased electrical resistivity which tends to reduce electrical current leakage within the capacitor.

Prior to preparing the anode active material 56 for fabrication into anodes 44, 46, the initial or base tantalum material is generally created using one of two methods. In the first process, an ingot of tantalum is first subjected to hydrogen at elevated temperatures to embrittle the material. The embrittled tantalum is then crushed into powder. In the second process, potassium tantalum fluoride is chemically reduced with sodium to produce the base tantalum powder. However, both base tantalum processes produce initial powders having varying particle sizes and morphologies. The varying range of particle sizes and morphologies are not conducive for fabrication into an anode of an electrolytic capacitor. Rather, a uniform particle size and morphology is more conducive for electrolytic capacitor anode fabrication. The cylindrically shaped tantalum particles having a more uniform particle size diameter encourages the creation of a porous anode body.

The term "morphology" is herein defined as the physical appearance of a material such as the appearance when viewed with a scanning electron microscope. In a preferred embodiment, the particles of tantalum are of a rod or cylindrically shape. Thus, the preferred morphology of the anode active material is one of a fibrous powder. The term "particle size distribution" is defined herein as the distribution of particle size with respect to cumulative percent of the material. For example, a material having a uniform particle size distribution may have a monomial particle size distribution. A monomial particle size distribution occurs when the majority of particles comprising the material have a single particle size.

The base tantalum material typically requires additional processing in which the material is made ready to be fabricated into an anode of an electrolytic capacitor. Generally, these additional material processing procedures modify the tantalum such that it has a more uniform oxide thickness, particle size and/or morphology. In a preferred embodiment, the tantalum comprises a layer of tantalum pentoxide. The properties of tantalum pentoxide are preferred for creating a capacitor having reduced current leakage. Furthermore, the desired attributes of the processed anode active material facilitate creation of anodes having a relatively high level of oxidized surface area and a dimensionally consistent core of un-oxidized tantalum for conduction of electrical current therewithin.

Figure 4:
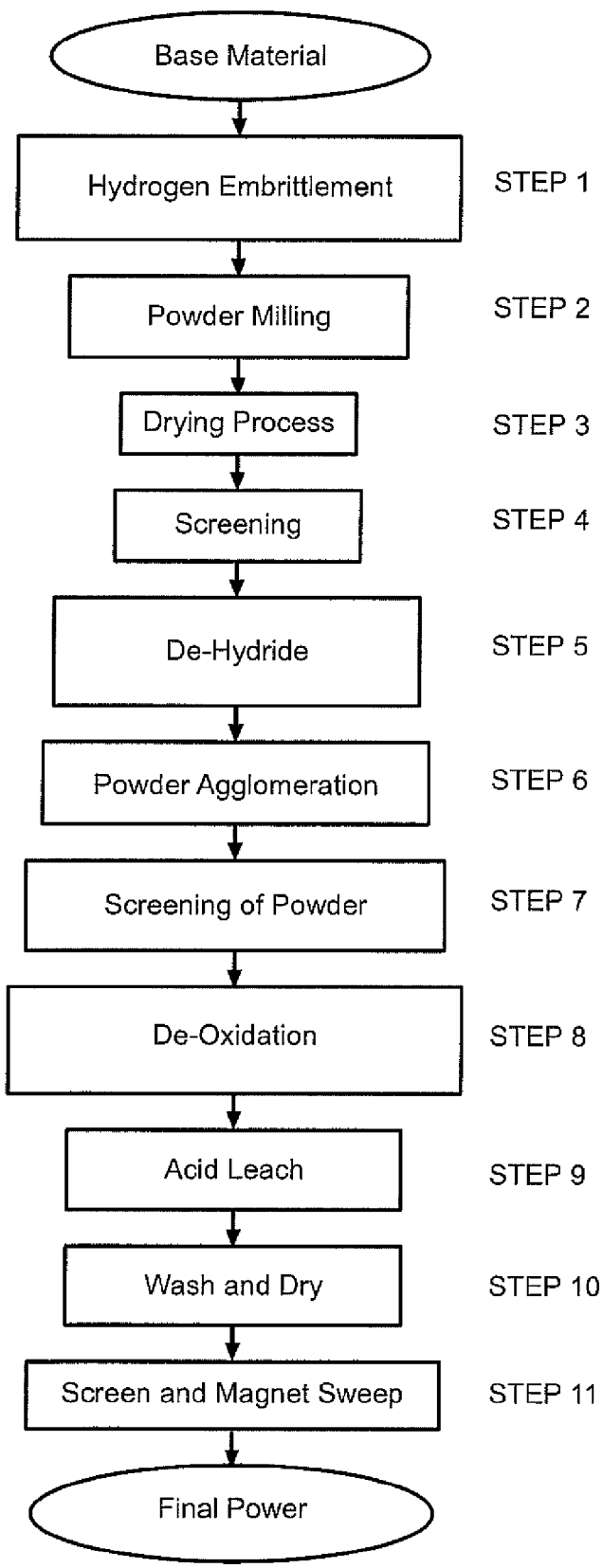
FIG. 4 is a flow chart illustrating the steps of the anode active material preparation process of the prior art.

FIG. 4 illustrates a flow chart of the tantalum material preparation process of the prior art that is used to prepare the anode active material 56 for incorporation into an anode. As illustrated, the process comprises a time consuming and cumbersome eleven step process that is prone to possible processing inconsistencies. In addition, the material preparation process of the prior art is also prone to potential contamination.

As shown, the initial step of the prior art process involves hydrogen embrittlement of the base tantalum material. In this step, the tantalum is subjected to hydrogen gas at temperatures up to 900° C. for as long as 18 hours. The introduction of the hydrogen gas within the structure of the tantalum embrittles the material such that it can be more readily milled. After the tantalum is embrittled, the material is then mechanically milled.

After milling, the tantalum material is then subjected to a de-hydriding process in which the previously introduced hydrogen is removed from the structure of the material. More specifically, the de-hydriding process subjects the milled material to an increased temperature either in a vacuum or argon rich environment to assist removal of hydrogen and modification of the oxidation state. In an embodiment, a portion of the surface thickness of the tantalum is oxidized into a more desirable tantalum pentoxide phase.

After being subjected to the de-hydriding step, the milled material is then further subjected to an agglomeration process in which smaller particles are combined to obtain a more desirable uniform or monomial particle size distribution. In the agglomeration step, the milled tantalum powder is subjected to multiple cycles of a high temperature environment of about 1,500-1,600° C. that join the particles together.

It is noted that in general, oxygen readily oxidizes the surface of tantalum. When the tantalum is prepared using the multi-step prior art process, the material undergoes multiple exposures of atmospheric oxygen followed by exposure to elevated temperatures. These cycles of atmospheric oxygen and subsequent exposure to elevated temperatures, particularly at temperatures greater than 800° C., cause the surface oxygen to diffuse within the structure of the tantalum. Thus, given the multiple steps of the prior art process, control of the diffused atmospheric oxygen within the material, and its resulting oxidation state, is difficult to control.

A correct balance of material processing conditions is required to achieve the ideal tantalum pentoxide phase within the depth of the surface of the tantalum. In particular, a correct amount of diffused oxygen is required to achieve the ideal phase of tantalum oxide. If too much oxygen diffuses into the tantalum structure, an undesirable phase of tantalum oxide could result having an electrical resistivity that is too low for use in an electrolytic capacitor.

It is for this reason that a de-oxidation step may be required to remove access oxygen from the tantalum structure. More specifically, in the de-oxidation step magnesium is added to the tantalum material and the mixture is further subjected to an increased temperature of about 800° C. to 1,000° C. An acid leach process comprising sulfuric acid and/or hydro fluoric acid is then utilized to remove magnesium from the tantalum. However, the acid leach step is not desirable because the caustic liquid requires special handling and precautions. Furthermore, exposure to these acids is known to cause potential harm to humans and the environment.

In contrast, the material preparation process of the present invention is less cumbersome and eliminates many of these prior art processing steps. Specifically, the anode active material preparation process of the present invention utilizes exposure to cryogenic temperatures, generally below −150°

C., to embrittle the tantalum material for milling. Therefore, the need to adjust the oxidation state of the anode material through the de-hydriding and subsequent de-oxidation steps are eliminated.

In the material preparation process of the present invention, the tantalum material is subjected to a cryogenic liquid 57 such as liquid nitrogen, having a temperature of about −210° C. to about −195° C. (depending on atmospheric pressure), liquid helium having a liquid temperature of about −269° C. or liquid hydrogen having a liquid temperature of about −252° C. Once subjected to the cryogenic temperature, the tantalum material is then milled to a desired particle size and distribution.

At ambient temperatures tantalum is generally a ductile material. Thus, when subjected to a mechanical stress, such as when subjected to mechanical milling, the material tends to bend rather than fracture. However, when subjected to cold temperatures, tantalum generally becomes brittle and is therefore in a more ideal state for milling. Specifically, with regards to tantalum, the material undergoes a phase change in which the ductile metal transitions into a crystalline body centered cubic crystal structure at about −198° C. Thus, subjecting tantalum to a cryogenic temperature of about −198° C., or less, transitions the material into a brittle crystalline form that is more conducive to milling.

Figure 5:
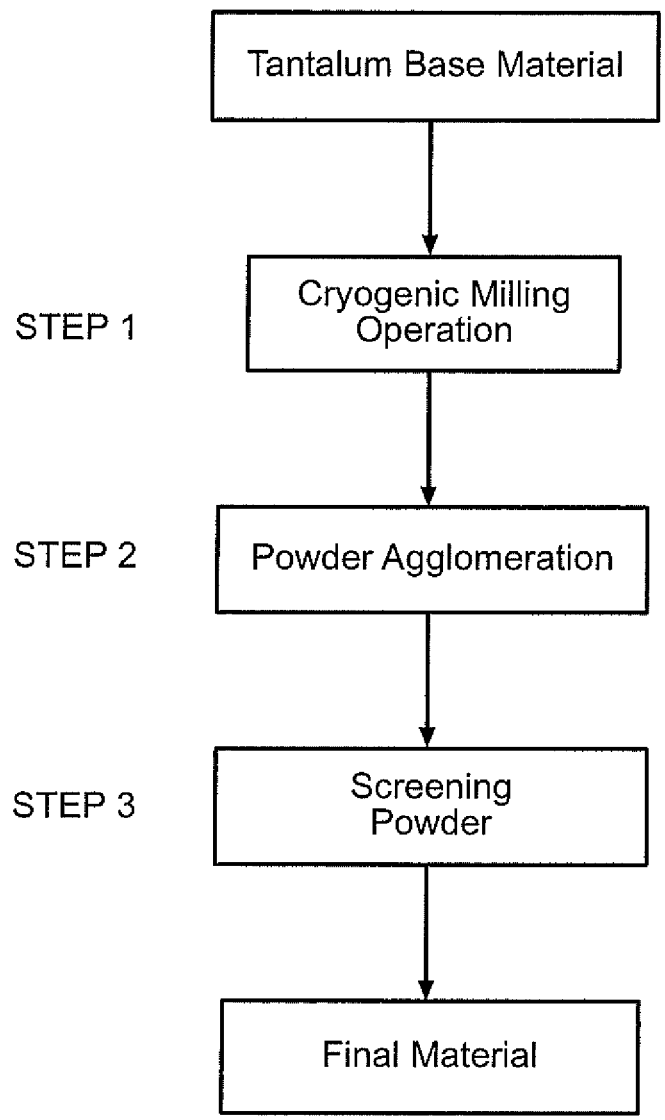
FIG. 5 is a flow chart showing the steps of the anode active material preparation process of the present invention.

FIG. 5 further illustrates the flow of the material process of the present invention. As shown, after the anode active material is milled to a desired particle size, the powdered material may be subjected to a powder agglomeration step in which the milled anode material is agglomerated together to achieve a desired particle size distribution. Similar to the agglomeration step of the prior art, the cryogenically milled material may be subjected to an increased maximum temperature of about 1,600° C. to cause the milled material to agglomerate or bind together, thus adjusting the particle size distribution.

As previously mentioned, the simplicity and cryogenic temperatures utilized in the material preparation process of the present invention, further reduce the potential for material contamination. In particular, it is believed that the material preparation process reduces contamination levels of hydrogen and iron. Specifically, it is believed that the active anode material 56 produced by the present invention comprises less than 50 parts per million (ppm) hydrogen (H) and less than 10 parts per million (ppm) iron (Fe).

In a preferred embodiment, the resulting anode active material comprises an average particle size diameter of less than about 5 µm. More specifically, the anode active material comprises an average particle size diameter that ranges from about 0.5 µm to about 3 µm, more preferably from about 1.25 µm to about 1.75 µm. The average particle length of the anode active material ranges from about 5 µm to about 25 µm, more preferably from about 10 µm to about 20 µm. The average particle length and diameter are preferably measured using a scanning electron microscope in which a sample size of 30 is used to obtain the average values. In addition, the surface area of the final anode active material preferably ranges from about 0.3 m$^2$/g to about 0.6 m$^2$/g. The surface area is preferably measured using the Brunauer-Emmett-Teller surface area measurement method. Furthermore, the finalized anode material should have a bulk density ranging from about 1 g/cc to about 3 g/cc per ASTM specification B212.

FIG. 6 illustrates an embodiment of a milling instrument 58 used to mill the anode active material 56, such as tantalum, at a cryogenic temperature. As shown, the anode active material 56 is positioned within the mill instrument 58, such as an attritor mill. The mill 58 comprises a bowl 60 in which the anode active material 56 is positioned. A series of mill blades 62 extend perpendicularly from a rotatable shaft 64 that rotates in a clockwise and/or counter-clockwise manner within the material. Milling media 66 may also be added to the material 56 within the bowl 60 of the mill 58. The milling media may be of a spherical or cylindrical shape comprising zirconia, zirconia toughened alumina or of the material being milled such as tantalum. As further shown in FIG. 6, a jacket 68 may be positioned around the bottom of the bowl 60 of the mill 58 such that a gap of space 70 resides between the external surface of the bowl and the interior surface of the jacket.

In an embodiment, a cryogenic liquid, such as liquid nitrogen or liquid helium, may reside within this gap of space 70. Alternatively, the cryogenic liquid may be added directly to the anode active material 56 within the milling instrument 58. The cryogenic liquid thus cools the anode active material 56 such that it becomes embrittled and easier to mill into small particles. The milling instrument 58 is not limited to an attritor mill. Other milling instruments and communition techniques such as ball milling, jet milling, vibratory milling, ultrasonic milling and hammer milling may also be used.

Once the anode active material is prepared, the powder is compressed into a pellet having the previously described anode wires embedded therein and extending therefrom. The anode pellets 44, 46 are sintered under a vacuum at high temperatures. The porous pellets 44, 46 are then anodized in a suitable electrolyte. This serves to form a continuous dielectric oxide film thereon. The anode assembly comprising the pellets 44, 46 and their associated anode wires 48A, 48B, 49 is then formed to a desired voltage to produce an oxide layer over the sintered bodies and the anode wires 48A, 48B, 49.

The capacitor 10 preferably comprises separators of electrically insulative material that completely surround and envelop the anodes. For example, the anode assembly 42 shown in the embodiment of FIGS. 3 and 3A comprises a first separator 72 enclosing the first anode 44 and a second separator 74 enclosing the second anode 46. The separators 72, 74 may be formed as pouches that enclose the anode pellets 44 and 46. In particular, separator 72, 74 is sealed with a flap of material that extends around the majority of the perimeter of anode pellet 44, 46. The individual sheets of separator material are preferably sealed by a process such as ultrasonic welding, or heat sealing.

Separators 72 and 74 prevent an internal electrical short circuit between the anode and cathode active materials in the assembled capacitor and have a degree of porosity sufficient to allow flow therethrough of the working electrolyte during the electrochemical reaction of the capacitor 10. Illustrative separator materials include woven and non-woven fabrics of polyolefinic fibers including polypropylene and polyethylene, or fluoropolymeric fibers including polyvinylidene fluoride, polyethylenetetrafluoroethylene, and polyethylenechloro-trifluoroethylene laminated or superposed with a polyolefinic or fluoropolymeric microporous film, non-woven glass, glass fiber materials and ceramic materials.

Suitable microporous films include a polyethylene membrane commercially available under the designation SOLUPOR®, (DMS Solutech); a polytetrafluoroethylene membrane commercially available under the designation ZITEX®, (Chemplast Inc.) or EXCELLERATOR®, (W. L. Gore and Associates); a polypropylene membrane commercially available under the designation CELGARD®, (Celgard LLC); and a membrane commercially available under the designation DEXIGLAS®, (C. H. Dexter, Div., Dexter Corp.). Cellulose based separators also typically used in capacitors are contemplated by the scope of the present invention. Depending on the electrolyte used, the separator can be treated to improve its wettability, for example with a surfactant, as is well known by those skilled in the art.

The structure of the cathode is best understood with reference to FIGS. 2, 3 and 3A. FIG. 3 illustrates a cross-sectional view of an embodiment of the capacitor 10 comprising a single anode 44. As shown in the figure, a first anode 44 resides between portions of a cathode active material 76 that contacts the inner surfaces of the casing face walls 18 and 24. In this embodiment, the capacitor 10 comprises a single anode sandwiched between layers of cathode active material 76 that are positioned along respective inner surfaces of side walls 18 and 24.

Likewise, FIG. 3A illustrates an alternate embodiment in which the capacitor 10 comprises a first and second anode 44, 46. As shown in FIG. 3A, another portion of the cathode active material 76 is positioned intermediate the anodes 44 and 46. The cathode active material 76 intermediate the anodes 44 and 46 is supported on opposed surfaces 78 and 80 of a current collector 82 (FIGS. 2 and 3A), preferably in the form of a foil. It is further contemplated that the capacitor of the present invention is not limited solely to a single or dual anode structure. For example, the capacitor of the present invention may comprise three or more anodes connected in electrical series or parallel to the terminal wire 30. A more detailed discussion of embodiments of three anode capacitors may be found in U.S. Pat. No. 7,813,107 to Druding et al. and U.S. Pat. No. 7,983,022 to O'Connor et al., both of which are assigned to the assignee of the present application and are incorporated by reference herein.

The cathode active material 76 preferably has a thickness of about a few hundred Angstroms to about 0.1 millimeters directly coated on the inner surface of the face walls 18 and 24 of casing members 14 and 16, or it may be coated on a conductive substrate (not shown) in electrical contact with the inner surface of the face walls. In that respect, the face walls 18 and 24 and the current collector 82 may be of an anodized-etched conductive material, or have a sintered cathode active material with or without oxide contacted thereto, or be contacted with a double layer capacitive material, for example a finely divided carbonaceous material such as graphite or carbon or platinum black, or be contacted with a redox, pseudocapacitive or an under potential material, or an electroactive conducting polymer such as polyaniline, polypyrrole, polythiophene, and polyacetylene, and mixtures thereof.

According to one preferred aspect of the present invention, the redox or cathode active material includes an oxide of a first metal, the nitride of the first metal, the carbon nitride of the first metal, and/or the carbide of the first metal, the oxide, nitride, carbon nitride and carbide having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, nickel, and lead.

The cathode active material 76 may also include a second or more metals. The second metal is in the form of an oxide, a nitride, a carbon nitride or carbide, and is not essential to the intended use of the conductive face walls 18 and 24 and the intermediate current collector 82 as a capacitor electrode, and the like. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the invention, the cathode active material includes an oxide of ruthenium or oxides of ruthenium and tantalum.

The mating casing members 14 and 16, and the electrically connected conductive substrate if it is provided, are preferably selected from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures and alloys thereof. Preferably, the face and side walls of the casing members 14 and 16 and the current collector 82 have a thickness of about 0.001 to about 2 millimeters.

The exemplary electrolytic-type capacitor 10 shown in FIG. 3A has the cathode active material preferably coating the face walls 78 and 80, with the coating spaced from the side wall 24 of casing member 16 and the peripheral edge of casing member 14. Such a coating is accomplished by providing the conductive face walls 18 and 24 of the respective casing members 14, 16 with a masking material in a known manner so that only the intended area of the face walls is contacted with active material. The masking material is removed from the face walls prior to capacitor fabrication. Preferably, the cathode active material is substantially aligned in a face-to-face relationship with the major faces of the anodes 44 and 46.

The cathode current collector 82 may comprise a tab 84 extending outwardly therefrom. The tab 84 is not provided with active material. Instead, it is left uncovered. In a preferred embodiment, the tab 84 is directly connected to a planar face comprising the previously described ferrule 34 (FIG. 2).

When fabrication of the anode/cathode assembly is complete, it is positioned inside the first casing member 14. The exposed distal portion of the feedthrough ferrule 34 is disposed in the opening 32 in side wall 20 with the distal end of terminal wire 30 extending outside the first casing member. The exposed distal portion of the feedthrough ferrule 34 is welded to side wall 20 to join and seal the feedthrough 28 to the casing member 14.

Casing member 14 is then mated with casing member 16 and sealed thereto, preferably by laser welding. The outer edge 22 of casing member 14 is flush with side wall 24 at the outermost edge 26 of casing member 16, and a weld 27 is formed at the interface between the edges 22 and 26. For a more detailed discussion regarding various casing constructions suitable for the present capacitor, reference is made to U.S. Pat. No. 7,012,799 to Muffoletto et al. This patent is assigned to the assignee of the present invention and incorporated herein by reference.

In a final step of providing capacitor 10, the void volume in casing 12 is filled with a working electrolyte (not shown) through a fill opening 86 (FIG. 1). This hole is then welded closed to complete the sealing process. A suitable working electrolyte for the capacitor 10 is described in U.S. Pat. No. 6,219,222 to Shah et al., which includes a mixed solvent of water and ethylene glycol having an ammonium salt dissolved therein. U.S. Pat. No. 6,687,117 to Liu and U.S. Patent Application Pub. No. 2003/0090857 describe other electrolytes for the present capacitor 10. The electrolyte of the latter publication comprises water, a water-soluble inorganic and/or organic acid and/or salt, and a water-soluble nitro-aromatic compound while the former relates to an electrolyte having de-ionized water, an organic solvent, isobutyric acid and a concentrated ammonium salt. These patents and publications are assigned to the assignee of the present invention and incorporated herein by reference.

It is, therefore, apparent that there has been provided, in accordance with the present invention, a capacitor containing at least one anode that is connected to a common terminal within the capacitor casing. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of fabricating a capacitor comprising the following steps:
    a) providing a case having first and second casing members;
    b) applying a cathode active material to a first face wall of the first casing member and a second face wall of the second casing member;
    c) providing an anode active material comprising the following steps:
        i) providing a base anode material;
        ii) providing a milling instrument;
        iii) positioning the base anode material within the milling instrument;
        iv) cooling the base anode material to a temperature below −150° C.; and
        v) milling the base anode material to an average particle diameter of less than 5 µm;
    d) forming the anode active material into an anode and positioning the anode within the first casing member;
    e) securing the second casing member to the first casing member such that the cathode active material faces the anode within the case; and
    f) filling the case with an electrolyte.

2. The method of claim 1 including selecting the base anode material from the group consisting of tantalum, aluminum, titanium, niobium, zirconium, hafnium, tungsten, molybdenum, vanadium, silicon, germanium, alloys, and mixtures thereof.

3. The method of claim 1 including milling the base anode material to an average particle diameter from about 0.5 µm to about 3 µm.

4. The method of claim 1 including milling the base anode material to an average particle length from about 5 µm to about 25 µm.

5. The method of claim 1 including milling the base anode material to an average particle surface area from about 0.3 $m^2/g$ to about 0.6 $m^2/g$.

6. The method of claim 1 including milling the base anode material to a bulk density from about 1 g/cc to about 3 g/cc per ASTM specification B212.

7. The method of claim 1 including selecting the milling instrument from the group consisting of an attritor mill, a jet mill, a vibratory mill, a ball mill, and a hammer mill.

8. The method of claim 1 including adding milling media with the base anode material within the milling instrument prior to the cooling step.

9. The method of claim 1 including providing a feedthrough having opposing proximal and distal terminal lead ends and positioning the feedthrough within an opening of a sidewall of the casing such that the proximal terminal lead end resides within the case and the distal terminal lead end resides outside the case.

10. The method of claim 9 including electrically connecting the anode to the terminal lead proximal end.

11. The method of claim 1 including selecting the cathode active material of an oxide, a nitride, or a carbon nitride from the group of metals consisting of ruthenium, cobalt, manganese, molybdenum, tungsten, tantalum, iron, niobium, iridium, titanium, zirconium, hafnium, rhodium, vanadium, osmium, palladium, platinum, nickel, lead, alloys, and mixtures thereof.

12. A method of preparing an anode active material for incorporation within a capacitor, the method comprising the following steps:
    a) providing a base anode material;
    b) providing a milling instrument;
    c) positioning the base anode material within the milling instrument;
    d) cooling the base anode material within the milling instrument to a temperature below −150° C.; and
    e) milling the base anode material to an average particle diameter of less than 5 µm.

13. The method of claim 12 including selecting the base anode material from the group consisting of tantalum, aluminum, titanium, niobium, zirconium, hafnium, tungsten, molybdenum, vanadium, silicon, germanium, alloys, and mixtures thereof.

14. The method of claim 12 including milling the base anode material to an average particle diameter from about 1 µm to about 2 µm.

15. The method of claim 12 including milling the base anode material to an average particle length from about 5 µm to about 25 µm.

16. The method of claim 12 including milling the base anode material to an average particle surface area from about 0.3 $m^2/g$ to about 0.6 $m^2/g$.

17. The method of claim 12 including milling the base anode material to a bulk density from about 1 g/cc to about 3 g/cc per ASTM specification B212.

18. The method of claim 12 including selecting the milling instrument from the group consisting of an attritor mill, a jet mill, a vibratory mill, a ball mill, and a hammer mill.

19. The method of claim 12 including adding milling media with the base anode material within the milling instrument prior to the cooling step.

20. The method of claim 12 including fabricating the anode active material into a capacitor anode.

* * * * *